(12) United States Patent
Terunuma

(10) Patent No.: US 6,947,261 B2
(45) Date of Patent: Sep. 20, 2005

(54) THIN FILM MAGNETIC HEAD AND METHOD OF MANUFACTURING THE SAME

(75) Inventor: Koichi Terunuma, Tokyo (JP)

(73) Assignee: TDK Corporation, Tokyo (JP)

( * ) Notice: Subject to any disclaimer, the term of this patent is extended or adjusted under 35 U.S.C. 154(b) by 191 days.

(21) Appl. No.: 09/983,972

(22) Filed: Oct. 26, 2001

(65) Prior Publication Data

US 2002/0075609 A1 Jun. 20, 2002

(30) Foreign Application Priority Data

Oct. 30, 2000 (JP) ........................................ 2000-331088

(51) Int. Cl.[7] .............................................. G11B 5/127
(52) U.S. Cl. ........................................................ 360/319
(58) Field of Search ................................ 360/319, 126, 360/317; 29/603.16, 603.13

(56) References Cited

U.S. PATENT DOCUMENTS

| | | | |
|---|---|---|---|
| 4,918,554 A | | 4/1990 | Bajorek et al. |
| 5,621,592 A | * | 4/1997 | Gill et al. ..................... 360/319 |
| 5,761,011 A | * | 6/1998 | Miyauchi et al. ........... 360/319 |
| 5,838,521 A | * | 11/1998 | Ravipati ....................... 360/319 |
| 6,038,106 A | * | 3/2000 | Aboaf et al. ................. 360/317 |
| 6,504,687 B1 | * | 1/2003 | Miyatake et al. ............ 360/319 |
| 6,549,370 B1 | * | 4/2003 | Kamijima ..................... 360/126 |
| 2001/0013998 A1 | * | 8/2001 | Narumi et al. ............... 360/319 |

FOREIGN PATENT DOCUMENTS

| | | |
|---|---|---|
| JP | A 60-239911 | 11/1985 |
| JP | A 2-116009 | 4/1990 |
| JP | A 6-195643 | 7/1994 |
| JP | A-11-161920 | 6/1999 |
| JP | A-2001-084536 | 3/2001 |

* cited by examiner

*Primary Examiner*—A. J. Heinz
*Assistant Examiner*—Mark Blouin
(74) *Attorney, Agent, or Firm*—Oliff & Berridge, PLC

(57) ABSTRACT

Provided are a thin film magnetic head and a method of manufacturing the same, which can prevent an output decrease without impairment of productivity and other characteristics, while adapting to an increase in a recording density. In the thin film magnetic head, an MR film is sandwiched in between first and second gap films having electrical insulating properties, which are sandwiched in between first and second shield layers. The first shield layer has an inner layer and an outer layer laminated in order from the MR film, and the second shield layer has an inner layer and an outer layer laminated in order from the MR film. The respective inner layers of the first and second shield layers have hardness higher than that of the respective outer layers thereof so as to prevent the first and second shield layers from deforming.

13 Claims, 10 Drawing Sheets

THIN FILM MAGNETIC HEAD AND METHOD OF MANUFACTURING THE SAME

BACKGROUND OF THE INVENTION

1. Field of the Invention

The invention relates to a thin film magnetic head for use in a magnetic recording apparatus or the like such as a hard disk drive, and a method of manufacturing the same.

2. Description of the Related Art

Recently, an improvement in performance of a thin film magnetic head has been sought in accordance with an increase in an areal recording density of a hard disk or the like. A composite thin film magnetic head, which has a laminated structure comprising a reproducing head having a magnetoresistive element (hereinafter referred to as an MR element) and a recording head having an inductive magnetic transducer, is widely used as the thin film magnetic head. The MR element has a single-layer or multilayer magnetoresistive film (hereinafter referred to as an MR film) which is sensitive to a signal magnetic field so as to exhibit a resistance change, and thus the MR film is adapted to read out information according to the resistance change of the MR film. As MR films, known are an AMR film exhibiting an anisotropic magnetoresistive effect (an AMR effect) and a GMR film exhibiting a giant magnetoresistive effect (a GMR effect).

The thin film magnetic head is formed on a block-shaped slider for moving along a recording surface of a magnetic medium, so as to be directly faced with the magnetic medium. A facing surface (hereinafter referred to as an air bearing surface) to be faced with the magnetic medium is obtained by polishing the thin film magnetic head together with the slider.

In general, many data elements (each of which is an area corresponding to 1 bit of information) are arranged on a track line formed on the magnetic medium, and a distance between the data elements is very short. Thus, when reading information of one data element, the MR film of the thin film magnetic head has to avoid being affected by magnetic fields of other data elements adjacent to the data element. Therefore, the thin film magnetic head has a structure such that the MR film is sandwiched in between a pair of shield layers having high magnetic permeability. A distance between the shield layers substantially corresponds to the distance between the data elements.

In accordance with a recent increase in the areal recording density of the hard disk or the like, it is required that the distance between the shield layers of the thin film magnetic head be further reduced in order to increase an arrangement density (i.e., a linear density) of the data elements on the track line. It is required that the distance between the shield layers be reduced to 80 nm or less in order to achieve the areal recording density in excess of 30 Gbit/inch$^2$ (4.7 Gbit/cm$^2$), for example.

However, such a reduction in the distance between the shield layers may cause the shield layers to deform and thus come into contact with the MR film, when the slider and the thin film magnetic head are polished to form the air bearing surface. In this case, a problem exists: that is, a short circuit occurs between each shield layer and the MR film, and thus, during the reading of information, a part of a sense current to pass through the MR film passes through the shield layers, so that this leads to an output decrease.

In order to prevent such a contact of the shield layers with the MR film, it is possible that the shield layers are made of a deformation-resistant material, namely, a material having high hardness. For example, in Unexamined Japanese Patent Application Publication No. Hei 2-116009, it is proposed that a shield layer is made of FeAlSi (sendust). Moreover, in Unexamined Japanese Patent Application Publication No. Sho 60-239911, it is proposed that a shield layer is made of an amorphous magnetic alloy. Furthermore, in Unexamined Japanese Patent Application Publication No. Hei 6-195643, it is proposed that a shield layer is made of an alloy made of Fe, N (nitrogen) and M (Ta (tantalum), Hf (hafnium) or the like).

However, the following problems in manufacturing exist when the shield layers are made of the material having high hardness as mentioned above. That is, one problem is as follows. Generally, the shield layers are formed by means of sputtering and are then patterned by use of ion milling or the like, and thus, when the shield layers are made of the above-mentioned material having high hardness, patterning requires long-time ion milling, which leads to deterioration in productivity. Another problem is as follows: that is, any of the above-mentioned materials having high hardness has low thermal conductivity and thus cannot efficiently diffuse heat generated by the MR film, so that this leads to a rise in temperature of the MR film.

SUMMARY OF THE INVENTION

The invention is designed to overcome the foregoing problems. It is an object of the invention to provide a thin film magnetic head and a method of manufacturing the same, which are capable of adapting to an increase in a linear recording density and also capable of preventing an output decrease without impairment of productivity and other characteristics.

A thin film magnetic head of the invention comprises: a functional film having a magnetic transducer function; a first gap film and a second gap film sandwiching the functional film in between, the first and second gap films each having electrical insulating properties; and a first shield layer and a second shield layer sandwiching the functional film with the first and second gap films in between, respectively, so as to prevent an undesired magnetic field from reaching to the functional film, wherein at least one of the first and second shield layers has an inner layer and an outer layer laminated in order from the functional film, and the inner layer has a hardness higher than that of the outer layer.

In the thin film magnetic head of the invention, at least one of the first and second shield layers has the inner layer having higher hardness close to the functional film. In the step of polishing a magnetic-field-facing surface of the thin film magnetic head, the existence of the inner layer allows at least one of the first and second shield layers to become resistant to deformation. Therefore, this allows preventing a contact of at least one of the first and second shield layers with the functional film and thus permits preventing an output decrease of the thin film magnetic head, even when a distance between the first and second shield layers is reduced in order to increase a linear recording density. Furthermore, at least one of the first and second shield layers has the outer layer having lower hardness than the hardness of the inner layer, and therefore the shield layer is patterned in a shorter time by means of ion milling or the like, as compared to a shield layer made of only a material having high hardness.

In the thin film magnetic head of the invention, when the first shield layer has the inner layer and the outer layer, it is preferable that the sum of a thickness of the inner layer of the first shield layer and a thickness of the first gap film be equal to or more than 40 nm. When the second shield layer has the inner layer and the outer layer, it is preferable that the sum of a thickness of the inner layer of the second shield layer and a thickness of the second gap film be equal to or more than 40 nm. Preferably, a Vickers hardness of the inner layer is equal to or higher than 500. Preferably, the thickness of the inner layer is equal to or less than 300 nm. Preferably, the outer layer contains Ni and Fe.

Another thin film magnetic head of the invention comprises: a functional film having a magnetic transducer function; a first insulating film and a second insulating film sandwiching the functional film in between; and a first magnetic layer and a second magnetic layer sandwiching the functional film with the first and second insulating films in between, respectively, wherein at least one of the first and second magnetic layers has an inner layer and an outer layer laminated in order from the functional film, and the inner layer has a hardness higher than that of the outer layer.

A method of manufacturing a thin film magnetic head of the invention including a functional film having a magnetic transducer function and a first shield layer and a second shield layer for preventing an undesired magnetic field from reaching to the functional film comprises the steps of forming the first shield layer on a base with an insulating layer in between; forming a first gap film having electrical insulating properties on the first shield layer; forming the functional film on the first gap film; forming a second gap film having electrical insulating properties on the functional film; and forming the second shield layer on the second gap film, wherein in at least one of the step of forming the first shield layer and the step of forming the second shield layer, at least one of the first and second shield layers is formed so as to have an inner layer and an outer layer laminated in order from the functional film, and so that the inner layer has a hardness higher than that of the outer layer.

In the method of manufacturing a thin film magnetic head of the invention, obtained is a thin film magnetic head in which at least one of the first and second shield layers has the inner layer having higher hardness close to the functional film.

In the method of manufacturing a thin film magnetic head of the invention, when the first shield layer has the inner layer and the outer layer, it is preferable that the step of forming the first shield layer include the step of forming the outer layer by means of plating and the step of forming the inner layer on the outer layer by means of sputtering. When the second shield layer has the inner layer and the outer layer, it is preferable that the step of forming the second shield layer include the step of forming the inner layer by means of sputtering, the step of forming a seed layer which is a part of the outer layer on the inner layer by means of sputtering, and the step of forming the remaining part of the outer layer by means of plating using the seed layer as an electrode.

Other and further objects, features and advantages of the invention will appear more fully from the following description.

DETAILED DESCRIPTION OF THE PREFERRED EMBODIMENTS

<Configuration of Magnetic Head Slider>

Firstly, a structure of a thin film magnetic head 1 according to an embodiment of the invention will be described with reference to FIGS. 1 to 7.

Figure 1:
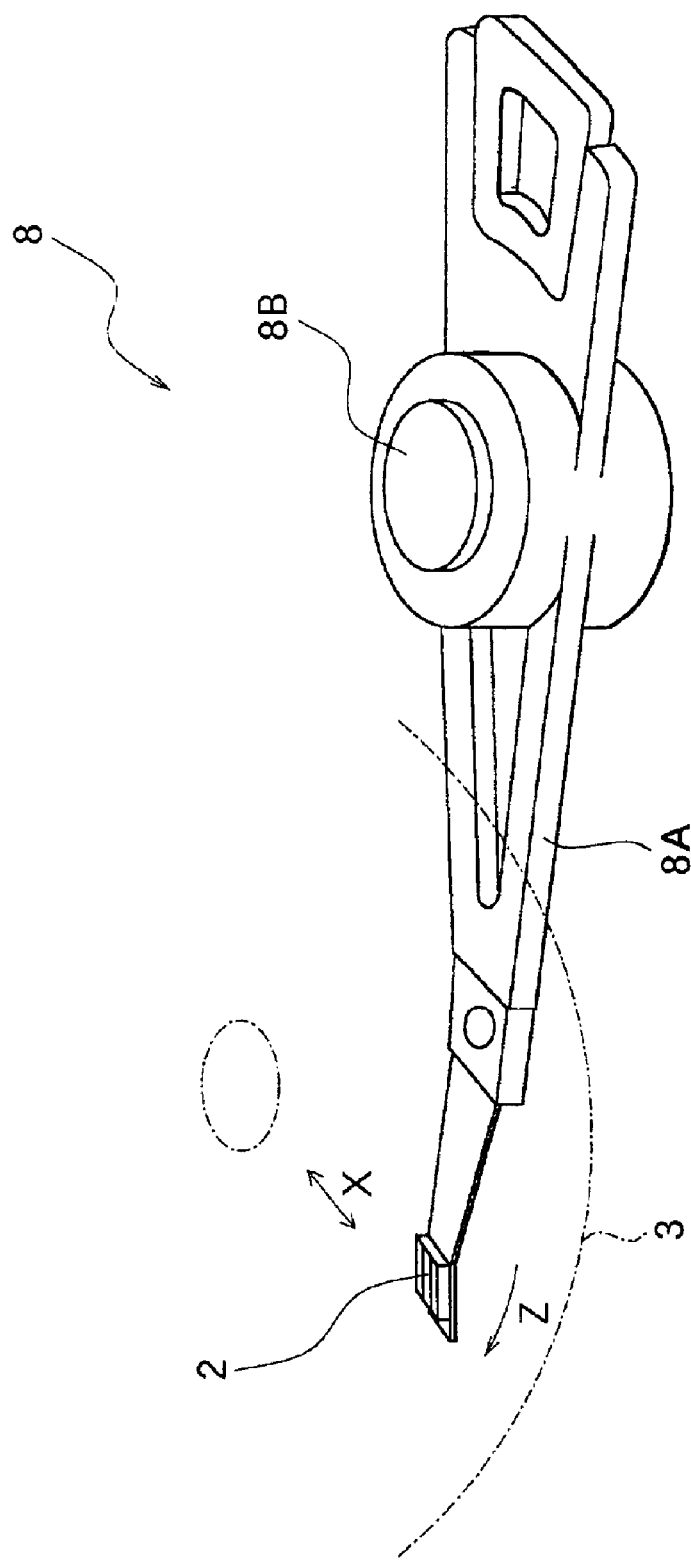
FIG. 1 is a perspective view of an outside shape of a rotating arm on which a thin film magnetic head according to an embodiment of the invention is mounted.

FIG. 1 shows a configuration of a rotating arm 8 comprising the thin film magnetic head 1 according to the embodiment. The rotating arm 8 is used in, for example, a hard disk drive (not shown) or the like and has a slider 2 on which the thin film magnetic head 1 (see FIG. 2) is formed. For instance, the slider 2 is mounted on the tip of an arm 8A which is rotatably supported by a pivot 8B. For example, the arm 8A is rotated by driving force of a voice coil motor (not shown), and thus the slider 2 moves in a direction X in which the slider 2 crosses a track line along a recording surface of a magnetic medium 3 such as a hard disk (a lower surface of the recording surface in FIG. 1). For example, the magnetic medium 3 rotates in a direction Z substantially perpendicular to the direction X in which the slider 2 crosses the track line.

Figure 2:
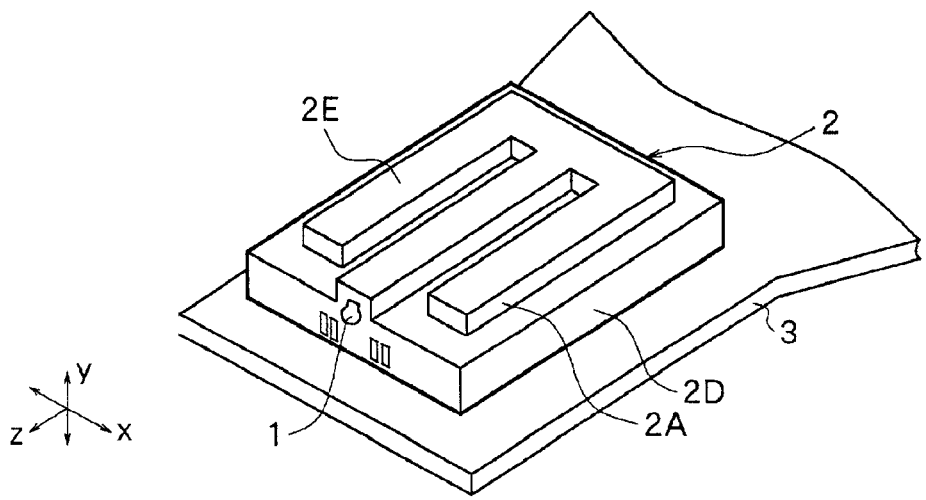
FIG. 2 is a perspective view of an outside shape of a slider on which the thin film magnetic head according to the embodiment of the invention is formed.

FIG. 2 shows a configuration of the slider 2 shown in FIG. 1. The slider 2 has a block-shaped base 2D made of $Al_2O_3$—TiC (alumina titanium carbide), for example. The base 2D is, for instance, substantially hexahedral in shape, and one surface of the base 2D closely faces the recording surface of the magnetic medium 3 (see FIG. 1). The surface facing the recording surface of the magnetic medium 3 is called an air bearing surface (ABS) 2E, which includes a slider rail 2A having a predetermined shape. The thin film magnetic head 1 is provided on one side of the base 2D (the left side in FIG. 2) faced with the air bearing surface 2E.

Figure 3:
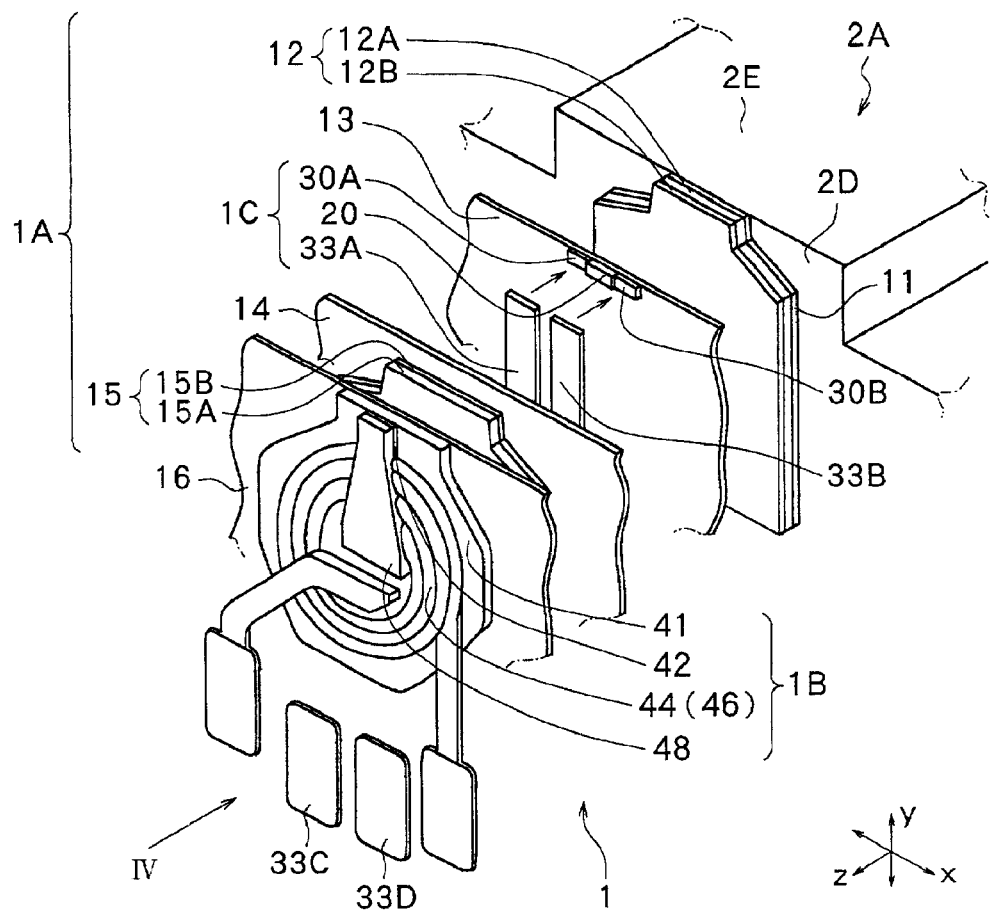
FIG. 3 is an exploded perspective view of a structure of the thin film magnetic head according to the embodiment of the invention.
Figure 4:
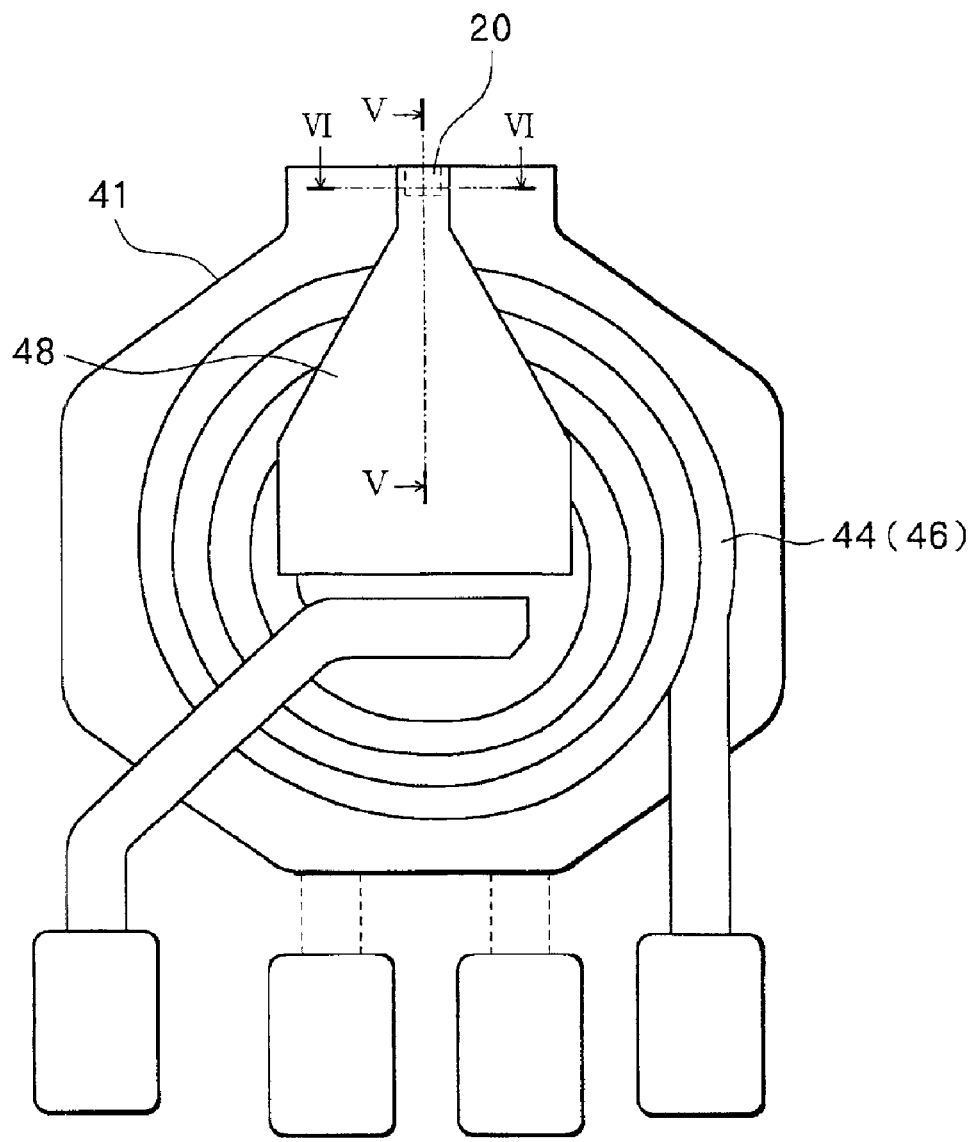
FIG. 4 is a plan view showing a planar shape of the thin film magnetic head shown in FIG. 3.
Figure 5:
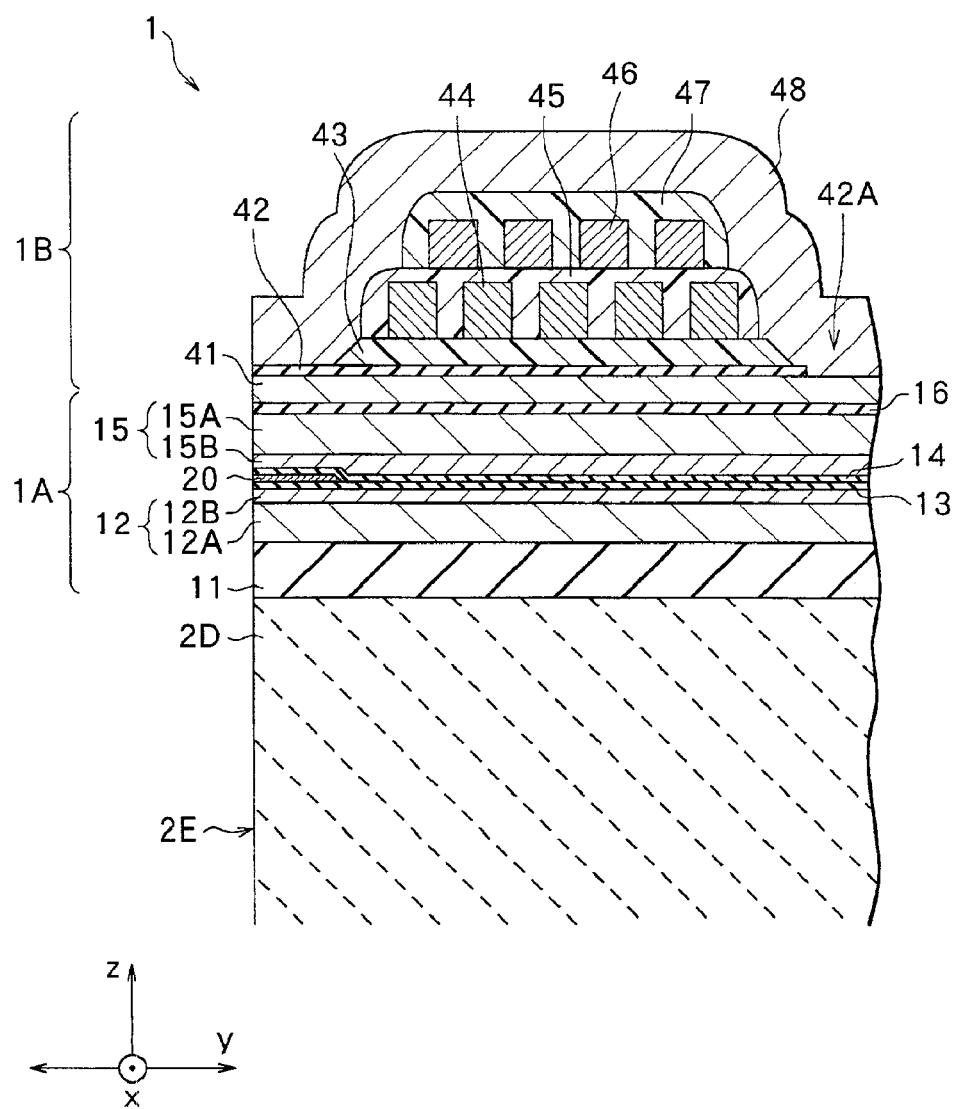
FIG. 5 is a cross sectional view showing a sectional structure of the thin film magnetic head shown in FIG. 3, showing a cross section perpendicular to an air bearing surface.
Figure 6:
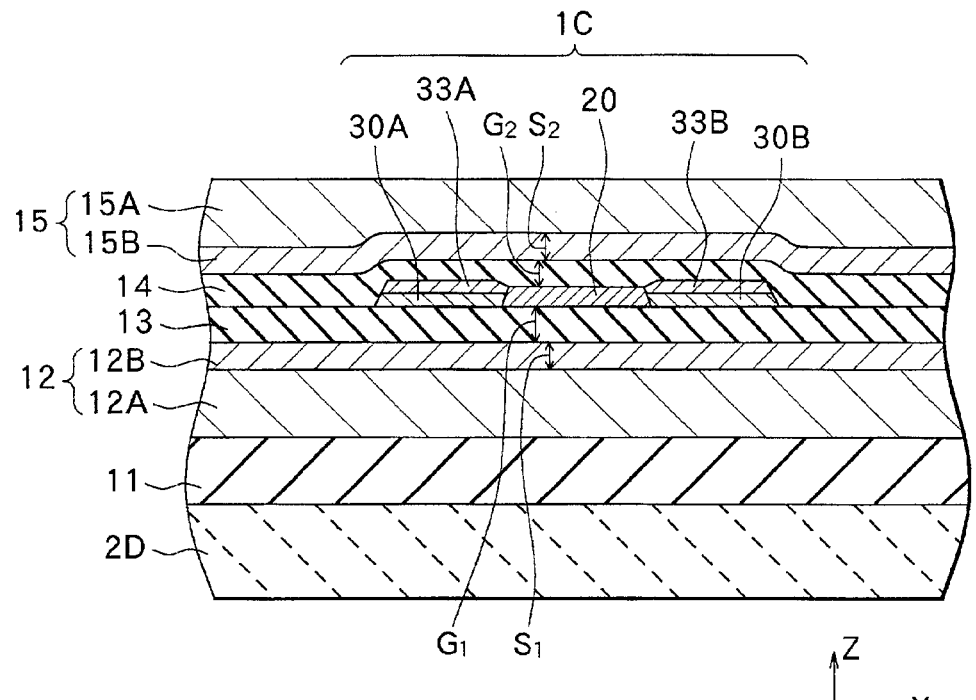
FIG. 6 is a cross sectional view showing a sectional structure of the thin film magnetic head shown in FIG. 3, showing a cross section parallel to the air bearing surface.

FIG. 3 shows an exploded view of a configuration of the thin film magnetic head 1. FIG. 4 shows a planar structure viewed in the direction of the arrow IV of FIG. 3. FIG. 5 shows a sectional structure viewed in the direction of the arrows along the line V—V of FIG. 4. FIG. 6 shows a sectional structure viewed in the direction of the arrows along the line VI—VI of FIG. 4. The thin film magnetic head 1 has an integrated structure comprising a reproducing head 1A for reproducing magnetic information recorded on the magnetic medium 3 and a recording head 1B for recording magnetic information on the magnetic medium 3.

As shown in FIGS. 3 and 5, the reproducing head 1A has a laminated structure comprising an insulating layer 11, a first shield layer 12, a first gap film 13, a second gap film 14, a second shield layer 15 and an insulating layer 16, which are laminated in this order on the base 2D. For example, the insulating layer 11 is 2 µm to 10 µm in thickness in a laminating direction (hereinafter referred to as a thickness) and is made of $Al_2O_3$ (aluminum oxide).

For example, each of the first and second shield layers 12 and 15 is 1 µm to 3 µm in thickness and is made of a magnetic material having high magnetic permeability. The first and second shield layers 12 and 15 function to prevent an undesired magnetic field from reaching to an MR film 20. Each of the first and second shield layers 12 and 15 has a planar shape shown in FIG. 3. In the embodiment, the first shield layer 12 corresponds to a specific example of "a first shield layer" or "a first magnetic layer" of the invention. The second shield layer 15 corresponds to a specific example of "a second shield layer" or "a second magnetic layer" of the invention.

As shown in FIG. 6, the first gap film 13 and the second gap film 14 are sandwiched in between the first shield layer 12 and the second shield layer 15, and the MR film 20 is sandwiched in between the first gap film 13 and the second gap film 14. The first shield layer 12 has an inner layer 12B and an outer layer 12A, which are located far from and close to the first gap film 13, respectively, and the inner layer 12B has a hardness higher than that of the outer layer 12A. On the other hand, the second shield layer 15 has an inner layer 15B and an outer layer 15A in order from the second gap film 14, and the inner layer 15B has a hardness higher than that of the outer layer 15A.

The outer layer 12A of the first shield layer 12 and the outer layer 15A of the second shield layer 15 are made of a magnetic material having high magnetic permeability in particular, e.g., NiFe (a nickel-iron alloy), because NiFe has high magnetic permeability and thus has a great effect in preventing an undesired magnetic field from reaching to the MR film 20 (the so-called shield effect). Moreover, NiFe has high thermal conductivity and thus has the advantage of being capable of efficiently dissipating heat generated by the MR film 20. More specifically, it is preferable to use NiFe in which the percentage of content of Ni is about 80 atom % and the percentage of content of Fe is about 20 atom % (hereinafter referred to as $Ni_{80}Fe_{20}$). An optimum thickness of the outer layers 12A and 15A is 0.5 µm to 5.0 µm.

The inner layer 12B of the first shield layer 12 and the inner layer 15B of the second shield layer 15 are made of a magnetic material having a hardness higher than that of the outer layer 12A and the outer layer 15A. For example, when the outer layers 12A and 15A are made of $Ni_{80}Fe_{20}$, their Vickers hardness Hv is about 250, and thus the inner layers 12B and 15B are made of a magnetic material whose Vickers hardness Hv is higher than 250, because this material allows the first and second shield layers 12 and 15 to become resistant to deformation in the step of polishing the air bearing surface 2E to be described later. Preferably, the Vickers hardness Hv of the inner layers 12B and 15B is, in particular, 500 or higher, because this can further ensure that the first and second shield layers 12 and 15 are prevented from deforming.

Preferably, the inner layer 12B and the inner layer 15B are made of, for example, NiFeV, NiFeB, CoZrNb, CoZrTa, FeAlSi, FeNiAlSi, FeN, FeAlN, FeZrN, FeZrC, FeZrBN, FeTaN or the like, because these materials have magnetism and also have a high Vickers hardness. Table 1 provides the exemplary compositions of materials which are preferably used as the inner layers 12B and 15B. Table 1 also provides the Vickers hardness Hv for each composition, which is obtained when each of the layers 12B and 15B is 500 nm in thickness and is under an indentation load of 0.1 g.

TABLE 1

| Composition (atom %) | Vickers hardness Hv |
|---|---|
| $Ni_{76}Fe_{19}V_5$ | 500 |
| $Ni_{76}Fe_{19}B_5$ | 500 |
| $Co_{83}Zr_8Nb_9$ | 750 |
| $Co_{85}Zr_6Ta_9$ | 780 |
| $Fe_{66}Al_{14}Si_{20}$ | 800 |
| $Fe_{64}Ni_2Al_{14}Si_{20}$ | 800 |
| $Fe_{95}N_5$ | 900 |
| $Fe_{92}Al_3N_5$ | 910 |
| $Fe_{84}Zr_8N_8$ | 1000 |
| $Fe_{84}Zr_8C_8$ | 1000 |
| $Fe_{84}Zr_5B_3N_8$ | 1100 |
| $Fe_{83}Ta_7N_{10}$ | 1100 |

A thickness S1 of the inner layer 12B of the first shield layer 12 is determined so that the sum of the thickness S1 and a thickness G1 of the first gap film 13 is equal to or more than 40 nm. Thus, a distance of at least 40 nm is created between the MR film 20 and the outer layer 12A, and therefore, even if the outer layer 12A becomes deformed, the deformed outer layer 12A is hard to extend to the MR film 20. Similarly, a thickness S2 of the inner layer 15B of the second shield layer 15 is determined so that the sum of the thickness S2 and a thickness G2 of the second gap film 14 is equal to or more than 40 nm. Thus, a distance of at least 40 nm is created between the MR film 20 and the outer layer 15A, and therefore, even if the outer layer 15A becomes deformed, the deformed outer layer 15A is hard to extend to the MR film 20. In the embodiment, the thicknesses S1, G1, S2 and G2 are measured on the air bearing surface 2E (see FIG. 5). An upper limit to the sum (S1+G1) of the thickness S1 of the inner layer 12B and the thickness G1 of the first gap film 13 and an upper limit to the sum (S2+G2) of the thickness S2 of the inner layer 15B and the thickness G2 of the second gap film 14 are appropriately determined according to a linear recording density of the magnetic medium.

For example, each of the first and second gap films 13 and 14 is 10 nm to 100 nm in thickness and is made of $Al_2O_3$ or AlN (aluminum nitride). The first and second gap films 13 and 14 function to provide electrical insulation between the MR film 20 to be described later and the first and second shield layers 12 and 15. For example, the insulating layer 16 is 10 nm to 100 nm in thickness and is made of $Al_2O_3$ or AlN in the same manner as the first and second gap films 13 and 14. The insulating layer 16 functions to provide electrical insulation between the reproducing head 1A and the recording head 1B. In the embodiment, the first gap film 13 corresponds to a specific example of "a first gap film" or "a first insulating film" of the invention. The second gap film 14 corresponds to a specific example of "a second gap film" or "a second insulating film" of the invention.

An MR element 1C including the MR film 20 that is a spin valve film is sandwiched in between the first gap film 13 and the second gap film 14. The reproducing head 1A is adapted to read out information recorded on the magnetic medium 3 through the use of the electrical resistance of the MR film 20 changing according to a signal magnetic field of the magnetic medium 3. In the embodiment, the MR film 20 corresponds to a specific example of "a functional film" of the invention.

Figure 7:
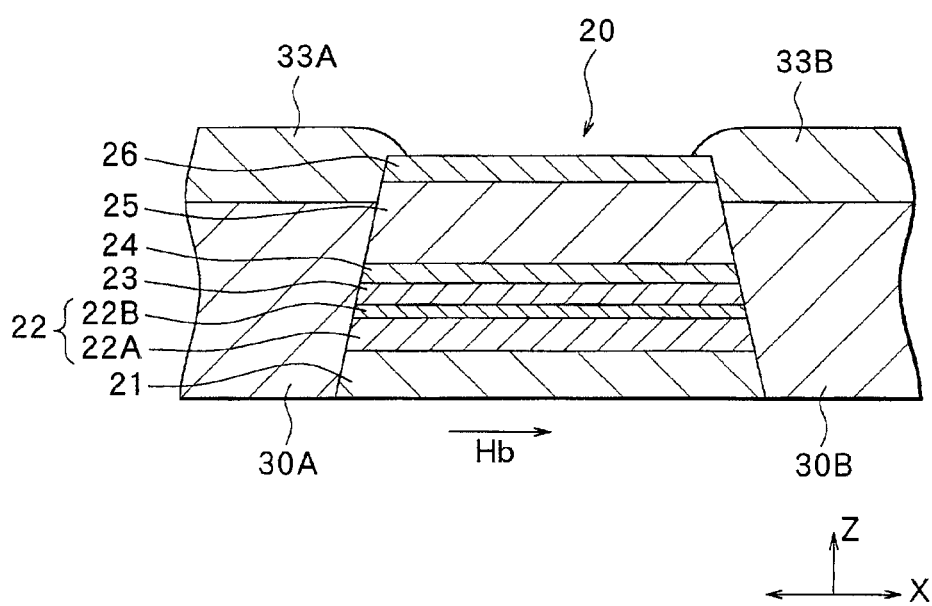
FIG. 7 is an enlarged sectional view of a structure of an MR element of the thin film magnetic head shown in FIG. 3.

FIG. 7 is a cross sectional view showing a sectional structure of the MR film 20. The MR film 20 has a laminated structure comprising an underlayer 21, a first soft magnetic layer 22A, a second soft magnetic layer 22B, a nonmagnetic layer 23, a ferromagnetic layer 24, an antiferromagnetic layer 25 and a cap layer 26, which are laminated in this order on the first gap film 13. For example, the underlayer 21 is 5 nm to 10 nm in thickness and is made of Ta (tantalum).

For example, the first soft magnetic layer 22A is 1 nm to 3 nm in thickness and is made of a magnetic material containing at least Ni in a group consisting of Ni (nickel), Co (cobalt) and Fe. For example, the second soft magnetic layer 22B is 0.5 nm to 3 nm in thickness and is made of a magnetic material containing at least Co in a group consisting of Ni, Co and Fe. The first soft magnetic layer 22A and the second soft magnetic layer 22B constitute a soft magnetic layer 22 which is sometimes called a free layer, and the soft magnetic layer 22 is adapted to change its orientation of magnetization according to a signal magnetic field from the magnetic medium 3.

For example, the nonmagnetic layer 23 is 1.8 nm to 3.0 nm in thickness and is made of a nonmagnetic material containing at least one element in a group consisting of Au (gold), Ag (silver), Cu (copper), Ru (ruthenium), Rh (rhodium), Re (rhenium), Pt (platinum) and W (tungsten). The nonmagnetic layer 23 functions to magnetically isolate the soft magnetic layer 22 from the ferromagnetic layer 24 and the antiferromagnetic layer 25 as much as possible.

For example, the ferromagnetic layer 24 is 2 nm to 4.5 nm in thickness and is made of a magnetic material containing at least Co in a group consisting of Co and Fe. Preferably, the ferromagnetic layer 24 is made of a magnetic material whose (111) plane is oriented in the laminating direction. The ferromagnetic layer 24 is sometimes called a pinned layer, and the orientation of magnetization of the ferromagnetic layer 24 is fixed by exchange coupling on an interface between the ferromagnetic layer 24 and the antiferromagnetic layer 25. In the embodiment, the orientation of magnetization of the ferromagnetic layer 24 is fixed in the Y-direction (see FIG. 5).

For example, the antiferromagnetic layer 25 is 5 nm to 30 nm in thickness and is made of an antiferromagnetic material containing at least one element in a group consisting of Pt, Ru, Rh, Pd (palladium), Ni, Au, Ag, Cu, Ir (iridium), Cr (chromium) and Fe, and Mn. The antiferromagnetic layer 25 may be made of an antiferromagnetic material containing at least one element in a group consisting of Ni, Fe and Co, and O (oxygen).

Antiferromagnetic materials include a non-heat-treatment type antiferromagnetic material which induces an exchange coupling magnetic field between the antiferromagnetic material and a ferromagnetic material without heat treatment, and a heat-treatment type antiferromagnetic material which induces an exchange coupling magnetic field between the antiferromagnetic material and a ferromagnetic material with heat treatment. The antiferromagnetic layer 25 may be made of either of the non-heat-treatment type antiferromagnetic material and the heat-treatment type antiferromagnetic material. Non-heat-treatment type antiferromagnetic materials include a MN alloy having γ-phase, and so forth. More specifically, RuRhMn (a ruthenium-rhodium-manganese alloy), FeMn (an iron-manganese alloy), IrMn (an iridium-manganese alloy) and the like are included. Heat-treatment type antiferromagnetic materials include a Mn alloy having a regular crystal structure, and so forth. More specifically, PtMn (a platinum-manganese alloy), NiMn (a nickel-manganese alloy), PtRhMn (a platinum-rhodium-manganese alloy) and the like are included.

For example, the cap layer 26 is 5 nm to 10 nm in thickness and is made of Ta or the like. The cap layer 26 functions to protect the MR film 20 in the process of manufacturing the thin film magnetic head 1.

Magnetic domain control films 30A and 30B are provided on both sides of the MR film 20 in a direction perpendicular to the laminating direction. The magnetic domain control films 30A and 30B are made of, for example, a hard magnetic material so as to generate a bias magnetic field Hb to the MR film 20 in the X-direction. The magnetic domain control films 30A and 30B generate the bias magnetic field Hb and thus orient the magnetization of the soft magnetic layer 22 of the MR film 20 in the direction of the bias magnetic field Hb, thereby preventing the so-called Barkhausen noise. For example, CoPt (cobalt-platinum), CoPtCr (cobalt-platinum-chromium), NdFeB (neodymium-iron-boron), SmCo (samarium-cobalt) or the like can be used as the hard magnetic material of which the magnetic domain control films 30A and 30B are made.

Lead layers 33A and 33B made of, for example, Ta are provided on the magnetic domain control films 30A and 30B, respectively. The lead layers 33A and 33B are connected to terminals 33C and 33D, respectively, through openings (not shown) formed in the second gap film 14 and the insulating layer 16. Thus, a current can be fed through the MR film 20 via the lead layers 33A and 33B.

For example, as shown in FIGS. 3 and 5, the recording head 1B has a bottom pole 41 of 0.5 $\mu$m to 3 $\mu$m thick made of a magnetic material such as NiFe, which is formed on the insulating layer 16 of the reproducing head 1A. A write gap film 42 of 0.05 $\mu$m to 0.3 $\mu$m thick made of $Al_2O_3$ or the like is formed on the bottom pole 41. The write gap film 42 has an opening 42A at a position corresponding to the center of thin film coils 44 and 46 to be described later. An insulating layer 43, which is made of $Al_2O_3$ or the like and has a thickness of 1.0 $\mu$m to 5.0 $\mu$m for determining a throat height, is formed on the write gap film 42. The thin film coil 44 of 1 $\mu$m to 3 $\mu$m thick and a photoresist layer 45 for coating the thin film coil 44 are formed on the insulating layer 43. The thin film coil 46 of 1 $\mu$m to 3 $\mu$m thick and a photoresist layer 47 for coating the thin film coil 46 are formed on the photoresist layer 45. In the embodiment, the description is given with regard to an example in which two thin film coil layers are laminated, but the number of thin film coil layers may be one, or three or more.

A top pole 48 of about 3 $\mu$m thick made of a magnetic material having a high saturation magnetic flux density, such as NiFe or FeN (iron nitride), is formed on the write gap film 42, the insulating layer 43 and the photoresist layers 45 and 47. The top pole 48 is in contact with and magnetically coupled to the bottom pole 41 through the opening 42A of the write gap film 42 formed at the position corresponding to the center of the thin film coils 44 and 46. Although not shown in FIGS. 3 to 5, an overcoat layer (an overcoat layer 49 shown in FIG. 15) of 20 μm to 30 μm thick made of, for example, $Al_2O_3$ is formed on the top pole 48 so as to coat the overall surface. In the embodiment, a laminar structure including the portions 41 to 49 corresponds to the recording head 1B. The recording head 1B generates a magnetic flux between the bottom pole 41 and the top pole 48 by a current passing through the thin film coils 44 and 46, and thus magnetizes the magnetic medium 3 by the magnetic flux generated near the write gap film 42, thereby recording information on the magnetic medium 3.

<Operation of MR Element and Thin Film Magnetic Head>

Next, a reproducing operation of the thin film magnetic head 1 configured as described above will be described with main reference to FIGS. 6 and 7.

In the thin film magnetic head 1, the reproducing head 1A reads out information recorded on the magnetic medium 3. In the reproducing head 1A, the orientation of magnetization of the ferromagnetic layer 24, for example, is fixed in the Y-direction by exchange coupling on the interface between the ferromagnetic layer 24 and the antiferromagnetic layer 25 of the MR film 20. The magnetization of the soft magnetic layer 22 is oriented in the same direction as the direction of the bias magnetic field Hb (the X-direction in the embodiment) by the bias magnetic field Hb generated by the magnetic domain control films 30A and 30B. The orientation of the bias magnetic field Hb is substantially perpendicular to the orientation of magnetization of the ferromagnetic layer 24. To read out information, a sense current that is a stationary electric current is fed through the MR film 20 through the lead layers 33A and 33B in the direction of the bias magnetic field Hb, for example.

Many data elements (each of which is an area corresponding to 1 bit of data) are arranged at regular intervals in the Z-direction on the track line of the magnetic medium 3. A distance between the first and second shield layers 12 and 15 of the thin film magnetic head 1 corresponds to a distance between two data elements on the track line of the magnetic medium 3. When the MR film 20 of the thin film magnetic head 1 faces one data element, magnetic fluxes from other data elements flow through the first and second shield layers 12 and 15, but the magnetic fluxes can hardly flow through the MR film 20. Moreover, a magnetic flux generated by the thin film coils 44 and 46 of the recording head 1B flows through the second shield layer 15, but the magnetic flux can hardly flow through the MR film 20. This prevents an undesired magnetic field from reaching to the MR film 20.

In the MR film 20 of the thin film magnetic head 1, the orientation of magnetization of the soft magnetic layer 22 changes according to a signal magnetic field of the magnetic medium 3. On the other hand, the orientation of magnetization of the ferromagnetic layer 24 does not change because the orientation thereof is fixed by exchange coupling between the ferromagnetic layer 24 and the antiferromagnetic layer 25. When the orientation of magnetization of the soft magnetic layer 22 changes, a current passing through the MR film 20 is subjected to resistance according to a relative angle between the orientation of magnetization of the soft magnetic layer 22 and the orientation of magnetization of the ferromagnetic layer 24. This results from a phenomenon that is called "spin-dependent scattering": that is, the degree of scattering of electrons on an interface between a nonmagnetic layer and a magnetic layer depends on the direction of magnetization of the magnetic layer. The amount of change in resistance of the MR film 20 is detected as the amount of change in voltage, and thus, information recorded on the magnetic medium 3 is read out.

In the embodiment, the first shield layer 12 and the second shield layer 15 have the outer layer 12A and the outer layer 15A, respectively, which are made of a material having high thermal conductivity. Therefore, heat generated by the MR film 20 is efficiently diffused via the outer layer 12A and the outer layer 15A. In other words, deterioration in performance incident to an excessive rise in temperature of the MR film 20 is prevented.

<Method of Manufacturing Thin Film Magnetic Head>

Next, a method of manufacturing the MR element 1C and the thin film magnetic head 1 will be described with reference to FIGS. 8 to 15. FIGS. 8 to 15 show a sectional structure taken along the line V—V of FIG. 4.

Figure 8:
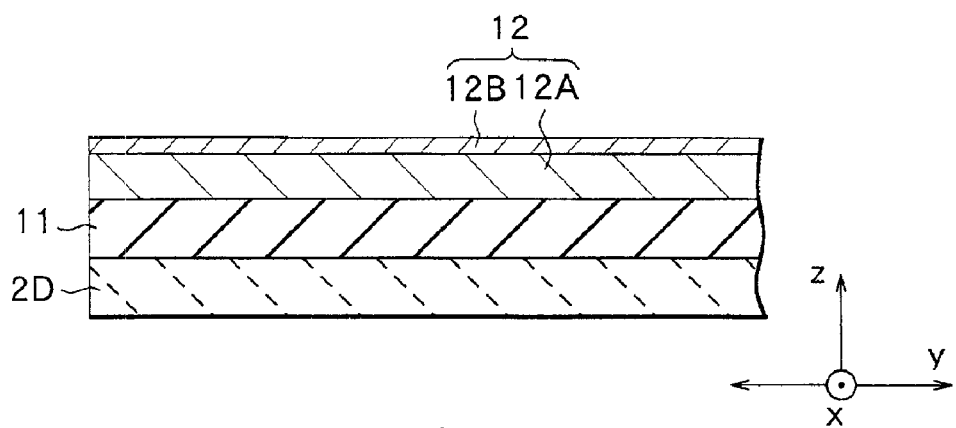
FIG. 8 is a cross sectional view for describing a step of a method of manufacturing the thin film magnetic head shown in FIG. 3.

In the manufacturing method according to the embodiment, first of all, as shown in FIG. 8, for example, the insulating layer 11 is formed on one surface of the base 2D made of $Al_2O_3$—TiC by means of sputtering using the material mentioned in the description of the configuration. Then, the outer layer 12A of the first shield layer 12 is formed on the insulating layer 11 by means of, for example, plating using the material mentioned in the description of the configuration. Then, the inner layer 12B is formed on the outer layer 12A by means of, for example, sputtering using the material mentioned in the description of the configuration. After that, the outer layer 12A and the inner layer 12B are patterned into a shape shown in FIG. 3 by means of ion milling.

Figure 9:
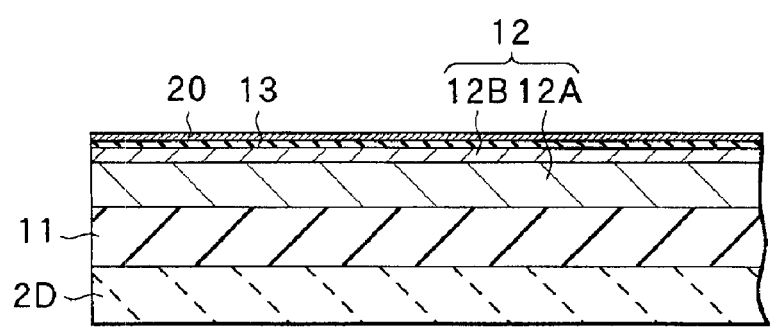
FIG. 9 is a cross sectional view for describing a step following the step shown in FIG. 8.
Figure 10:
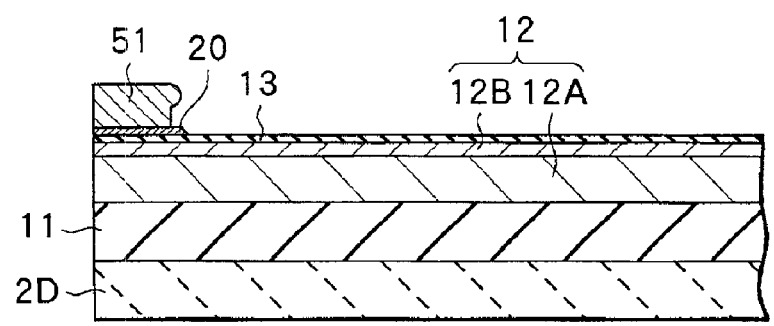
FIG. 10 is a cross sectional view for describing a step following the step shown in FIG. 9.

Then, as shown in FIG. 9, the underlayer 21, the first soft magnetic layer 22A, the second soft magnetic layer 22B, the nonmagnetic layer 23, the ferromagnetic layer 24, the antiferromagnetic layer 25 and the cap layer 26 are formed in sequence on the first shield layer 12 by means of, for example, sputtering using the materials mentioned in the description of the configuration, and thus the MR film 20 is formed. After that, as shown in FIG. 10, a photoresist film 51 for patterning is selectively formed on the MR film 20. After forming the photoresist film 51, the MR film 20 is etched by means of, for example, ion milling using the photoresist film 51 as a mask, and thus the MR film 20 having a shape shown in FIG. 7 is formed.

After patterning the MR film 20, the magnetic domain control films 30A and 30B shown in FIG. 7 are formed on both sides of the MR film 20 by means of, for example, sputtering using the hard magnetic material mentioned in the description of the configuration. After that, the lead layers 33A and 33B shown in FIG. 7 are formed on the magnetic domain control films 30A and 30B, respectively, by means of sputtering using the material mentioned in the description of the configuration. After that, the photoresist film 51 and a deposit laminated on the photoresist film 51 are removed by means of lift-off procedures, for example.

Figure 11:
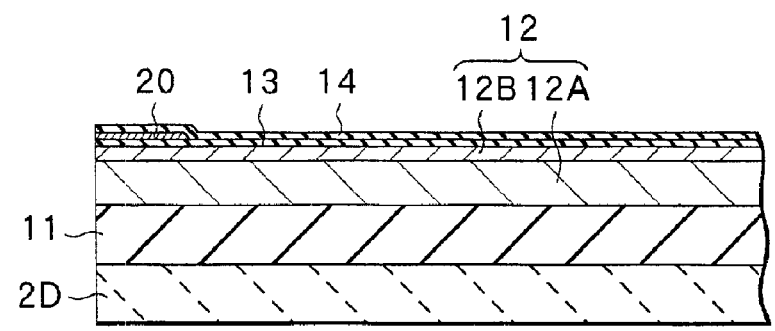
FIG. 11 is a cross sectional view for describing a step following the step shown in FIG. 10.
Figure 12:
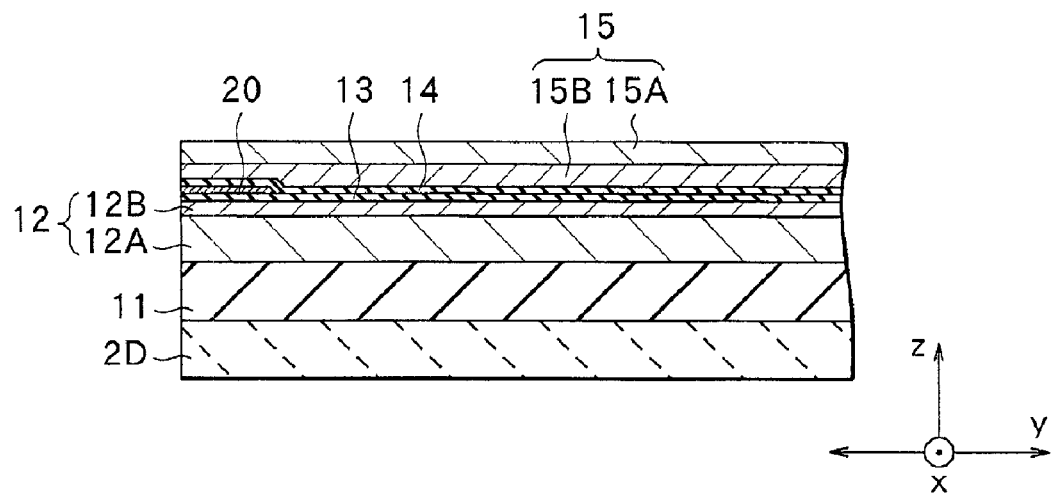
FIG. 12 is a cross sectional view for describing a step following the step shown in FIG. 11.
Figure 13:
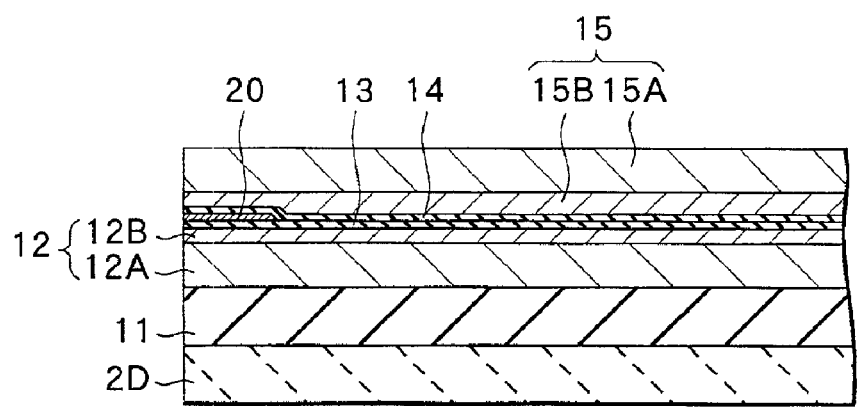
FIG. 13 is a cross sectional view for describing a step following the step shown in FIG. 12.

After lift-off procedures, as shown in FIG. 11, the second gap film 14 is formed by means of, for example, sputtering using the material mentioned in the description of the configuration, so as to coat the first gap film 13 and the MR film 20. Thus, the MR film 20 is sandwiched in between the first gap film 13 and the second gap film 14. After that, as shown in FIG. 12, the inner layer 15B of the second shield layer 15 is formed on the second gap film 14 by means of, for example, sputtering using the material mentioned in the description of the configuration. After that, a part of the outer layer 15A is formed on the inner layer 15B by means of sputtering, for example. In this case, the outer layer 15A, which is to have a thickness of 2 μm, is formed with a thickness of, for example, only 30 nm by means of sputtering. Then, as shown in FIG. 13, the remaining part (of about 2 μm thick) of the outer layer 15A is formed by means of plating using as an electrode the part of the outer layer 15A formed by means of sputtering. After forming the outer layer 15A of the second shield layer 15, the second shield layer 15 is patterned into a shape shown in FIG. 3 by means of ion milling.

Figure 14:
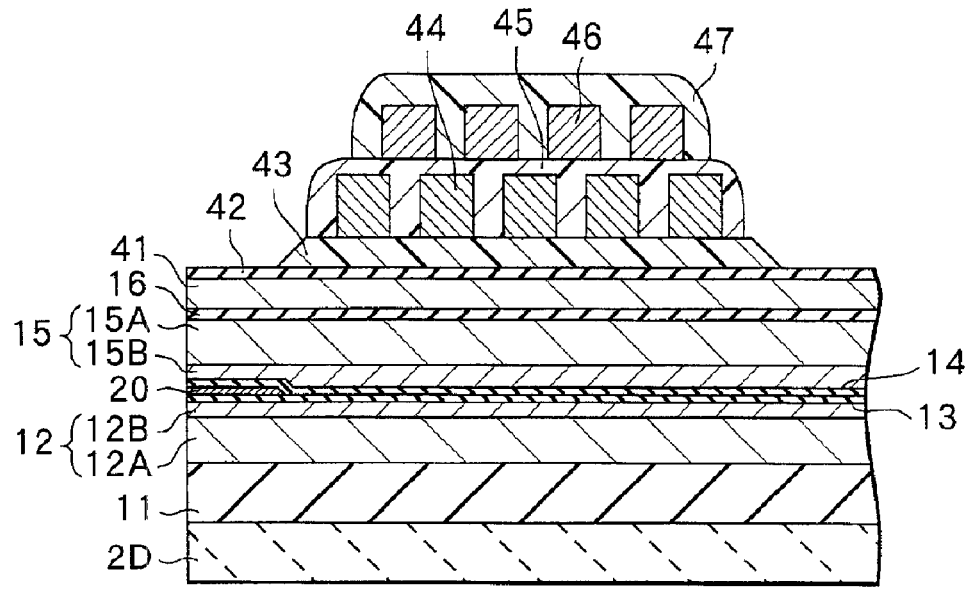
FIG. 14 is a cross sectional view for describing a step following the step shown in FIG. 13.

After patterning the second shield layer 15, the insulating layer 16 is formed by means of, for example, sputtering using the material mentioned in the description of the configuration. After forming the insulating layer 16, as shown in FIG. 14, the bottom pole 41 is formed on the insulating layer 16 by means of, for example, sputtering using the material mentioned in the description of the configuration. Then, the write gap film 42 is formed on the bottom pole 41 by means of, for example, sputtering, and then the insulating layer 43 is formed into a predetermined pattern on the write gap film 42. After forming the insulating layer 43, the thin film coil 44 is formed on the insulating layer 43 by using the material mentioned in the description of the configuration, and then the photoresist layer 45 is formed into a predetermined pattern so as to coat the thin film coil 44. After forming the photoresist layer 45, the thin film coil 46 is formed on the photoresist layer 45 by using the material mentioned in the description of the configuration, and then the photoresist layer 47 is formed into a predetermined pattern so as to coat the thin film coil 46.

Figure 15:
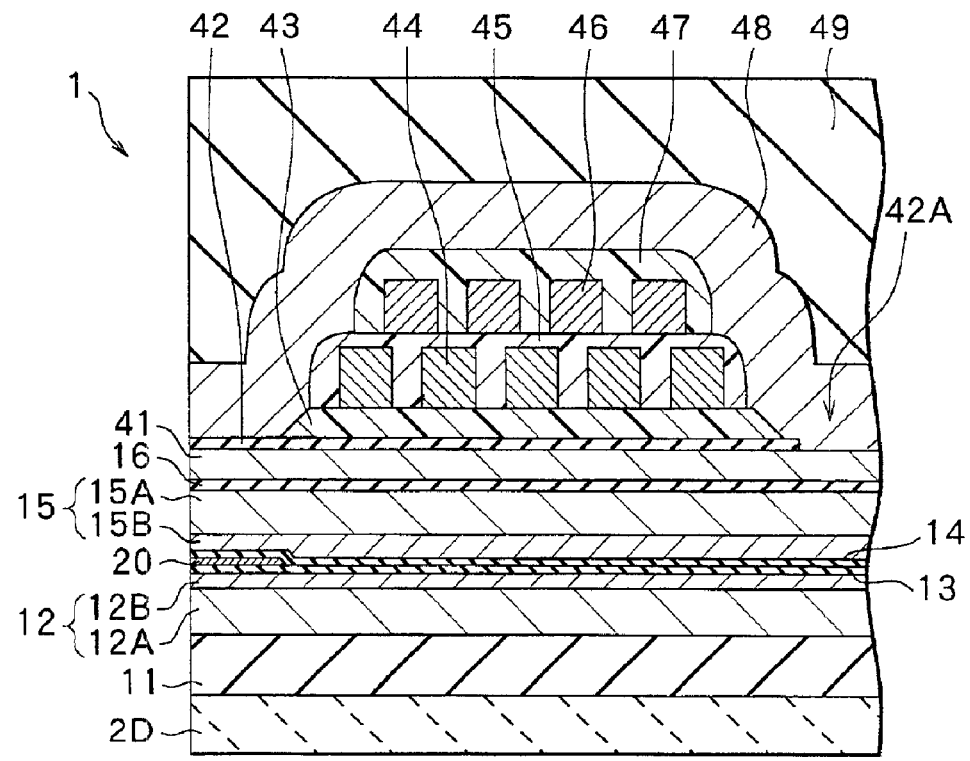
FIG. 15 is a cross sectional view for describing a step following the step shown in FIG. 14.

After forming the photoresist layer 47, as shown in FIG. 15, for example, the write gap film 42 is partly etched at the position corresponding to the center of the thin film coils 44 and 46, and thus the opening 42A for forming a magnetic path is formed. After that, for example, the top pole 48 is formed on the write gap film 42, the opening 42A, the insulating layer 43 and the photoresist layers 45 and 47 by using the material mentioned in the description of the configuration. After forming the top pole 48, for example, the write gap film 42 and the bottom pole 41 are selectively etched by means of ion milling using the top pole 48 as a mask. After that, the overcoat layer 49 is formed on the top pole 48 by using the material mentioned in the description of the configuration.

After forming the overcoat layer 49, for example, heat treatment takes place to induce exchange coupling between the ferromagnetic layer 24 and the antiferromagnetic layer 25 of the MR film 20. More specifically, the thin film magnetic head 1 is heated at a blocking temperature of the antiferromagnetic layer 25 and the ferromagnetic layer 24 in a state in which a magnetic field is applied in, for example, the Y-direction by use of a magnetic field generating apparatus or the like. Thus, the orientation of magnetization of the ferromagnetic layer 24 is fixed in the direction Y of the applied magnetic field by exchange coupling between the ferromagnetic layer 24 and the antiferromagnetic layer 25.

Finally, for example, the air bearing surface 2E of the slider 2 is polished, and thus the thin film magnetic head 1 is completed. In the step of polishing the slider 2, the first and second shield layers 12 and 15 have the inner layers 12B and 15B having higher hardness, respectively, which are located close to the MR film 20, and therefore the first and second shield layers 12 and 15 are prevented from deforming and thus coming into contact with the MR film 20.

<Advantages of Embodiment>

As described above, according to the embodiment, the first and second shield layers 12 and 15 have the inner layers 12B and 15B having higher hardness, respectively, which are located close to the MR film 20. In the step of polishing the air bearing surface 2E, the first and second shield layers 12 and 15 are therefore prevented from deforming and thus coming into contact with the MR film 20. This allows preventing a contact of the first and second shield layers 12 and 15 with the MR film 20 and thus permits preventing an output decrease of the thin film magnetic head 1, even when the distance between the first and second shield layers 12 and 15 is reduced in order to increase a linear recording density.

More particularly, the sum of the thickness S1 of the inner layer 12B of the first shield layer 12 and the thickness G1 of the first gap film 13 is equal to or more than 40 nm, and the sum of the thickness S2 of the inner layer 15B of the second shield layer 15 and the thickness G2 of the second gap film 14 is equal to or more than 40 nm. Even when the outer layers 12A and 15A become deformed, the deformed outer layers 12A and 15A are therefore hard to come into contact with the MR film 20.

Furthermore, the inner layers 12B and 15B have a Vickers hardness Hv of 500 or higher, so that this can further ensure that the first and second shield layers 12 and 15 are prevented from deforming, and therefore this can further ensure that the first and second shield layers 12 and 15 are prevented from coming into contact with the MR film 20.

Moreover, the outer layers 12A and 15A are provided in the embodiment, and therefore the embodiment facilitates patterning using ion milling or the like, as compared to the case where the whole first and second shield layers 12 and 15 are made of a material having high hardness. Accordingly, the thin film magnetic head can be manufactured in a shorter time.

In addition, the outer layers 12A and 15A are made of a material having high thermal conductivity, and therefore, heat generated by the MR film 20 can be efficiently diffused, so that this can prevent deterioration in performance due to the heat of the MR film 20.

Additionally, each of the inner layers 12B and 15B has a thickness of 300 nm or less, and therefore the time required for ion milling or the like of the first and second shield layers 12 and 15 is relatively short.

Moreover, the outer layers 12A and 15A are made of NiFe, and therefore the outer layers 12A and 15A can obtain high magnetic permeability, so that an undesired magnetic flux can flow through the outer layers 12A and 15A so as not to flow through the MR film 20. In other words, the effect of preventing an undesired magnetic field from reaching to the MR film 20 can be enhanced.

<Modified Embodiments>

Figure 16:
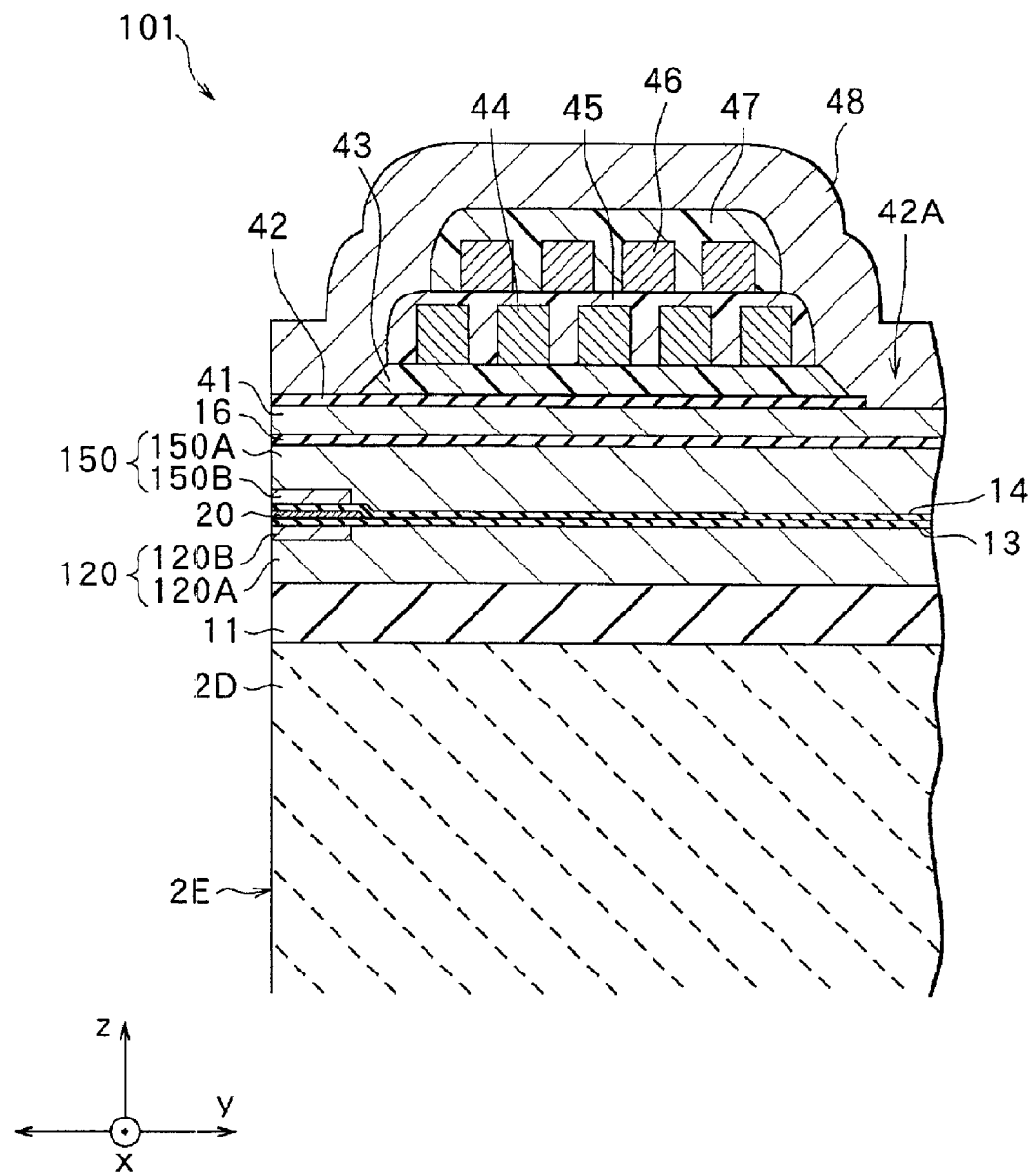
FIG. 16 is a cross sectional view showing a sectional structure of a thin film magnetic head according to a modified embodiment.

FIG. 16 shows a sectional structure of a thin film magnetic head 101 according to a modified embodiment. In the thin film magnetic head 101 according to the modified embodiment, a first shield layer 120 comprises an outer layer 120A and an inner layer 120B, and the inner layer 120B is locally formed only in a region near the air bearing surface 2E. Similarly, a second shield layer 150 comprises an outer layer 150A and an inner layer 150B, and the inner layer 150B is locally formed only in a region near the air bearing surface 2E.

In the modified embodiment, the inner layers 120B and 150B are only locally formed, but, at least in the air bearing surface 2E, the MR film 20 is sandwiched in between the first and second gap films 13 and 14, which are sandwiched in between the inner layers 120B and 150B. In the step of polishing the air bearing surface 2E, the first and second shield layers 120 and 150 are therefore prevented from deforming and thus prevented from coming into contact with the MR film 20, as in the case of the above-described embodiment.

The inner layers 120B and 150B may be locally formed in the X-direction in FIG. 6, for example. In this case, the inner layers 120B and 150B are formed at a position at which at least the MR film 20 is sandwiched in between the inner layers 120B and 150B in the laminating direction, and thus the first and second shield layers 120 and 150 are prevented from coming into contact with the MR film 20, as in the case of the above-described embodiment and modified embodiment.

EXAMPLES

Next, specific examples of the invention will be described in detail.

Example 1

Ten types of thin film magnetic heads 1 shown in FIG. 5 were made as an example 1, and the respective inner layers 12B and 15B of the first and second shield layers 12 and 15 had varying thicknesses. Each thin film magnetic head 1 was made in the following manner. First, the insulating layer 11 of 2 $\mu$m thick was formed of $Al_2O_3$ on the base 2D made of $Al_2O_3$—TiC by means of sputtering, and the outer layer 12A of 2 $\mu$m thick of the first shield layer 12 was formed of $Ni_{80}Fe_{20}$ on the insulating layer 11 by means of plating. After that, the inner layer 12B was formed of $Fe_{84}Zr_8N_8$ on the outer layer 12A of the first shield layer 12 by means of sputtering. The inner layers 12B had thicknesses varying from 5 nm to 50 nm at intervals of 5 nm. Then, the first gap film 13 of 10 nm thick was formed of $Al_2O_3$ on the inner layer 12B of the first shield layer 12 by means of, for example, sputtering.

Then, the underlayer 21 of 5 nm thick was formed of Ta on the first gap film 13 by means of sputtering, the first soft magnetic layer 22A of 3 nm thick was formed of NiFe on the underlayer 21, and the second soft magnetic layer 22B of 1 nm thick was formed of CoFe on the first soft magnetic layer 22A. Then, the nonmagnetic layer 23 of 2.5 nm thick was formed of Cu on the second soft magnetic layer 22B by means of sputtering, the ferromagnetic layer 24 of 2 nm thick was formed of CoFe on the nonmagnetic layer 23, the antiferromagnetic layer 25 of 20 nm thick was formed of PtMn on the ferromagnetic layer 24, and the cap layer 26 of 5 nm thick was formed of Ta on the antiferromagnetic layer 25. After forming the cap layer 26, heat treatment took place to subject the antiferromagnetic layer 25 to an antiferromagnetizing process.

Then, a laminated film including the layers 21 to 26 was patterned by means of ion milling, and thus the MR film 20 having a shape shown in FIG. 6 was formed. Then, the magnetic domain control films 30A and 30B each having a thickness of 50 nm were formed of CoPt on both sides of the MR film 20 by means of, for example, sputtering, and the lead layers 33A and 33B each having a thickness of 100 nm were formed into a predetermined shape on the magnetic domain control films 30A and 30B, respectively, by means of, for example, sputtering.

After forming the lead layers 33A and 33B, the second gap film 14 of 10 nm thick was formed of $Al_2O_3$ by means of sputtering so as to coat the MR film 20, the magnetic domain control films 30A and 30B and the lead layers 33A and 33B. Then, the inner layer 15B of the second shield layer 15 was formed of $Fe_{84}Zr_8N_8$ on the second gap film 14 by means of sputtering. The inner layers 15B had thicknesses varying from 5 nm to 50 nm at intervals of 5 nm. Then, a 30-nm-thick part of the outer layer 15A was formed of $Ni_{80}Fe_{20}$ on the inner layer 15B by means of sputtering. Then, the outer layer 15A of 2 $\mu$m thick was formed of $Ni_{80}Fe_{20}$ by means of plating using the 30-nm-thick part of the outer layer 15A as an electrode film.

The insulating layer 16, the bottom pole 41, the write gap film 42, the insulating layer 43, the thin film coil 44, the photoresist layer 45, the thin film coil 46, the photoresist layer 47, the top pole 48 and the overcoat layer 49 shown in FIG. 5 were laminated on the second shield layer 15. Since the structure including the portions 16 and 41 to 49 (i.e., the recording head 1B) has no influence on items of the example to be measured, the detailed description thereof is omitted. A sufficient number of thin film magnetic heads 1 of each type were made to check the fraction defective.

Example 2

Ten types of thin film magnetic heads 1 shown in FIG. 5 were made as an example 2 similarly to the example 1, that is, ten types of thin film magnetic heads 1 of each of the examples 1 and 2 were made. However, both of the first and second gap films 13 and 14 had a thickness of 20 nm. As in the case of the example 1, the respective inner layers 12B and 15B of the first and second shield layers 12 and 15 had thicknesses varying from 5 nm to 50 nm at intervals of 5 nm. As in the case of the example 1, a sufficient number of thin film magnetic heads 1 of each type were made to check the fraction defective.

The resistance of the MR film 20 of each of twenty types of thin film magnetic heads 1 made as described above was measured, the number of thin film magnetic heads having resistance values that were 10% or more lower than a predetermined reference resistance value was counted, and the rate of the counted thin film magnetic heads was calculated as the fraction defective. The reference resistance value was set in the following manner: that is, a thin film magnetic head having no first and second shield layers 12 and 15 (i.e., a thin film magnetic head having a structure in which the MR film 20 was sandwiched directly in between the insulating layers 11 and 16) was formed, and a resistance value of the MR film of the thin film magnetic head was measured.

[Comparisons 1 and 2]

As comparisons to the examples, thin film magnetic heads were made under the same conditions as the conditions for the examples 1 and 2, except that the respective inner layers 12B and 15B of the first and second shield layers 12 and 15 were not provided. The fraction defective of the comparisons 1 and 2 is also shown in FIG. 17.

Figure 17:
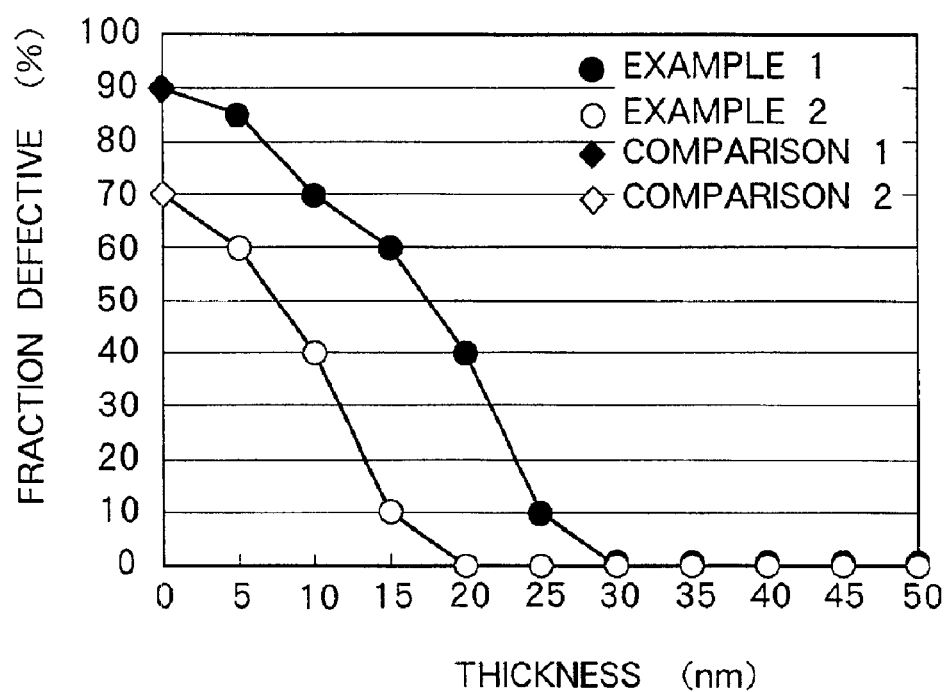
FIG. 17 is a plot of the results of measurement of fraction defective of examples of the invention.

As can be seen from FIG. 17, when the example 1 having the first and second gap films 13 and 14 each having a thickness of 10 nm is compared to the comparison 1, it has been shown that the example 1 having the inner layers 12B and 15B can be reduced in fraction defective, as compared to the comparison 1 having no inner layers 12B and 15B. It has been shown that the fraction defective can become approximately 0, particularly when each of the inner layers 12B and 15B has a thickness of 30 nm or more.

When the example 2 having the first and second gap films 13 and 14 each having a thickness of 20 nm is compared to the comparison 2, it has been shown that the example 2 having the inner layers 12B and 15B can be reduced in fraction defective, as compared to the comparison 2 having no inner layers 12B and 15B. It has been shown that the fraction defective can become approximately 0, particularly when each of the inner layers 12B and 15B has a thickness of 20 nm or more.

In the example 1, the fraction defective can become approximately 0 when each of the inner layers 12B and 15B has a thickness of 30 nm or more. In the example 2, the fraction defective can become approximately 0 when each of the inner layers 12B and 15B has a thickness of 20 nm or more. Therefore, it has been shown that the fraction defective can become approximately 0 when the sum (S1+G1) of the thickness S1 of the inner layer 12B and the thickness G1 of the first gap film 13 is equal to or more than 40 nm or when the sum (S2+G2) of the thickness S2 of the inner layer 15B and the thickness G2 of the second gap film 14 is equal to or more than 40 nm.

Although the invention is described above by referring to the embodiment and examples, the invention is not limited to these embodiment and examples and various modifications of the invention are possible. For example, in the above-described embodiment, both of the first and second shield layers 12 and 15 have the inner layer and the outer layer, but only either the first or second shield layer 12 or 15 may have the inner layer and the outer layer.

In the above-described embodiment, the antiferromagnetic layer 25 of the MR film 20 is made of a heat-treatment type antiferromagnetic material, but the antiferromagnetic layer 25 may be made of a non-heat-treatment type antiferromagnetic material. In this case, exchange coupling can be induced on the interface between the antiferromagnetic layer 25 and the ferromagnetic layer 24 without heat treatment.

In the above-described embodiment, the magnetic domain control films 30A and 30B are made of a hard magnetic material, but the magnetic domain control films 30A and 30B may have a laminated structure comprising an antiferromagnetic film and a ferromagnetic film. When the antiferromagnetic film is made of a heat-treatment type antiferromagnetic material, heat treatment is necessary to induce exchange coupling between the antiferromagnetic film and the ferromagnetic film. When the antiferromagnetic film is made of a non-heat-treatment type antiferromagnetic material, heat treatment is not necessary.

The MR film of the thin film magnetic head 1 is not limited to the spin valve film, and the MR film may be any of other types of films such as a GMR film, an AMR film and a TMR (tunnel-type magnetoresistive) film. The thin film magnetic head 1 may be a head for reproducing only, a magnetic sensor or a memory.

As described above, according to the thin film magnetic head of the invention or the method of manufacturing a thin film magnetic head of the invention, at least one of the first and second shield layers has the inner layer and the outer layer, and the inner layer having higher hardness is located close to a magnetic layer. Therefore, in the step of polishing or the like, at least one of the first and second shield layers becomes resistant to deformation. This allows preventing a contact of the first and second shield layers with the functional film and therefore permits preventing an output decrease of the thin film magnetic head, even when the distance between the first and second shield layers is reduced in order to increase the linear recording density. Furthermore, the outer layer having lower hardness than the hardness of the inner layer is provided, and therefore the shield layer can undergo patterning or the like in a shorter time, as compared to a shield layer which is wholly made of a high-hardness material, so that deterioration in productivity can be prevented. Furthermore, a material having high thermal conductivity is selected as the outer layer, and thus the thermal conductivity of at least one of the first and second shield layers can be also improved. Therefore, heat generated by the functional film can be efficiently diffused, so that deterioration in performance incident to an excessive rise in temperature of the functional film can be prevented. In other words, it is possible to prevent an output decrease of the thin film magnetic head without impairment of productivity and other characteristics, as well as to adapt to an increase in the linear recording density.

According to the thin film magnetic head of the invention, the sum of the thickness of the first gap film and the thickness of the inner layer of the first shield layer is equal to or more than 40 nm, or the sum of the thickness of the second gap film and the thickness of the inner layer of the second shield layer is equal to or more than 40 nm. Therefore, this can further ensure that the first and second shield layers are prevented from coming into contact with the functional film.

According to the thin film magnetic head of the invention, the Vickers hardness of the inner layer is equal to or higher than 500. Therefore, the first or second shield layer becomes more resistant to deformation, so that this can further ensure that the first and second shield layers are prevented from coming into contact with the functional film.

According to the thin film magnetic head of the invention, the thickness of the inner layer is equal to or less than 300 nm, and therefore the time required for patterning or the like can be such that the productivity of the thin film magnetic head does not deteriorate.

According to the thin film magnetic head of the invention, the outer layer is made of a material containing Ni and Fe. Therefore, high magnetic permeability can be obtained, so that the effect of preventing an undesired magnetic field from reaching to the functional film can be enhanced.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head comprising:
   a functional film having a magnetic transducer function;
   a first gap film and a second gap film sandwiching the functional film in between, the first and second gap films each having electrical insulating properties, wherein a thickness of each of the first gap film and second gap film is equal to or more than 10 nm and equal to or less than 20 nm; and
   a first shield layer and a second shield layer sandwiching the functional film with the first and second gap films in between, respectively, so as to prevent an undesired magnetic field from reaching to the functional film,
   wherein each of the first and second shield layers has an inner layer and an outer layer laminated in order from the functional film, and the inner layer has a hardness higher than that of the outer layer,
   the sum of a thickness of the inner layer of the first shield layer and a thickness of the first gap film is equal to or more than 40 nm,
   the sum of a thickness of the inner layer of the second shield layer and a thickness of the second gap film is equal to or more than 40 nm, the thickness of the inner layer is equal to or less than 300 nm.

2. A thin film magnetic head according to claim 1, wherein a Vickers hardness of the inner layer is equal to or higher than 500.

3. A thin film magnetic head according to claim 2, wherein the inner layer is composed of any one of NiFeV, NiFeB, CoZrNb, CoZrTa, FeAlSi, FeNiAlSi, FeN, FeAlN, FeZrN, FeZrC, FeZrBN, and FeTaN.

4. A thin film magnetic head according to claim 1, wherein the outer layer is made of a material containing nickel (Ni) and iron (Fe).

5. A thin film magnetic head comprising:
   a functional film having a magnetic transducer function;
   a first insulating film and a second insulating film sandwiching the functional film in between, wherein a thickness of each of the first insulating film and second insulating film is equal to or more than 10 nm and equal to or less than 20 nm; and
   a first magnetic layer and a second magnetic layer sandwiching the functional film with the first and second insulating films in between, respectively,
   wherein each of the first and second magnetic layers has an inner layer and an outer layer laminated in order from the functional film, and the inner layer has a hardness higher than that of the outer layer,
   the sum of a thickness of the inner layer of the first magnetic layer and a thickness of the first insulating film is equal to or more than 40 nm,
   the sum of a thickness of the inner layer of the second magnetic layer and a thickness of the second insulating film is equal to or more than 40 nm,
   the thickness of the inner layer is equal to or less than 300 nm.

6. A thin film magnetic head according to claim 5, wherein a Vickers hardness of the inner layer is equal to or higher than 500.

7. A thin film magnetic head according to claim 6, wherein the inner layer is composed of any one of NiFeV, NiFeB, CoZrNb, CoZrTa, FeAlSi, FeNiAlSi, FeN, FeAlN, FeZrN, FeZrC, FeZrBN, and FeTaN.

8. A method of manufacturing a thin film magnetic head including a functional film having a magnetic transducer function and a first shield layer and a second shield layer for preventing an undesired magnetic field from reaching to the functional film, comprising the steps of:
   forming the first shield layer on a base with an insulating layer in between;
   forming a first gap film having electrical insulating properties on the first shield layer;
   forming the functional film on the first gap film;
   forming a second gap film having electrical insulating properties on the functional film, wherein a thickness of each of the first gap film and second gap film is equal to or more than 10 nm and equal to or less than 20 nm; and
   forming the second shield layer on the second gap film,
   wherein in each of the steps of forming the first shield layer and the step of forming the second shield layer, the first and second shield layers are formed so as to have an inner layer and an outer layer laminated in order from the functional film, and so that the inner layer has a hardness higher than that of the outer layer,
   the sum of a thickness of the inner layer of the first shield layer and a thickness of the first gap film is equal to or more than 40 nm,
   the sum of a thickness of the inner layer of the second shield layer and a thickness of the second gap film is equal to or more than 40 nm,
   the thickness of the inner layer is equal to or less than 300 nm.

9. A method of manufacturing a thin film magnetic head according to claim 8, wherein the step of forming the first shield layer includes the step of forming the outer layer by means of plating, and the step of forming the inner layer on the outer layer by means of sputtering.

10. A method of manufacturing a thin film magnetic head according to claim 9, wherein the step of forming the second shield layer includes the step of forming the inner layer by means of sputtering, the step of forming a seed layer which is a part of the outer layer on the inner layer by means of sputtering, and the step of forming the remaining part of the outer layer by means of plating using the seed layer as an electrode.

11. A method of manufacturing a thin film magnetic head according to claim 8, wherein the step of forming the second shield layer includes the step of forming the inner layer by means of sputtering, the step of forming a seed layer which is a part of the outer layer on the inner layer by means of sputtering, and the step of forming the remaining part of the outer layer by means of plating using the seed layer as an electrode.

12. A method of manufacturing a thin film magnetic head according to claim 8, wherein a Vickers hardness of the inner layer is equal to or higher than 500.

13. A method of manufacturing a thin film magnetic head according to claim 12, wherein the inner layer is composed of any one of NiFeV, NiFeB, CoZrNb, CoZrTa, FeAlSi, FeNiAlSi, FeN, FeAlN, FeZrN, FeZrC, FeZrBN, and FeTaN.

* * * * *